April 21, 1959 R. W. KETCHLEDGE 2,883,467

COMMUNICATION SWITCHING SYSTEM EMPLOYING GAS TUBES

Filed April 29, 1954 2 Sheets-Sheet 1

INVENTOR
R. W. KETCHLEDGE
BY
ATTORNEY

INVENTOR
R. W. KETCHLEDGE
BY
ATTORNEY

United States Patent Office 2,883,467

Patented Apr. 21, 1959

2,883,467

COMMUNICATION SWITCHING SYSTEM EMPLOYING GAS TUBES

Raymond W. Ketchledge, Whippany, N.J., assignor to Bell Telephone Laboratories, Incorporated, New York, N.Y., a corporation of New York Application April 29, 1954, Serial No. 426,338

9 Claims. (Cl. 179—18)

Figure 1:
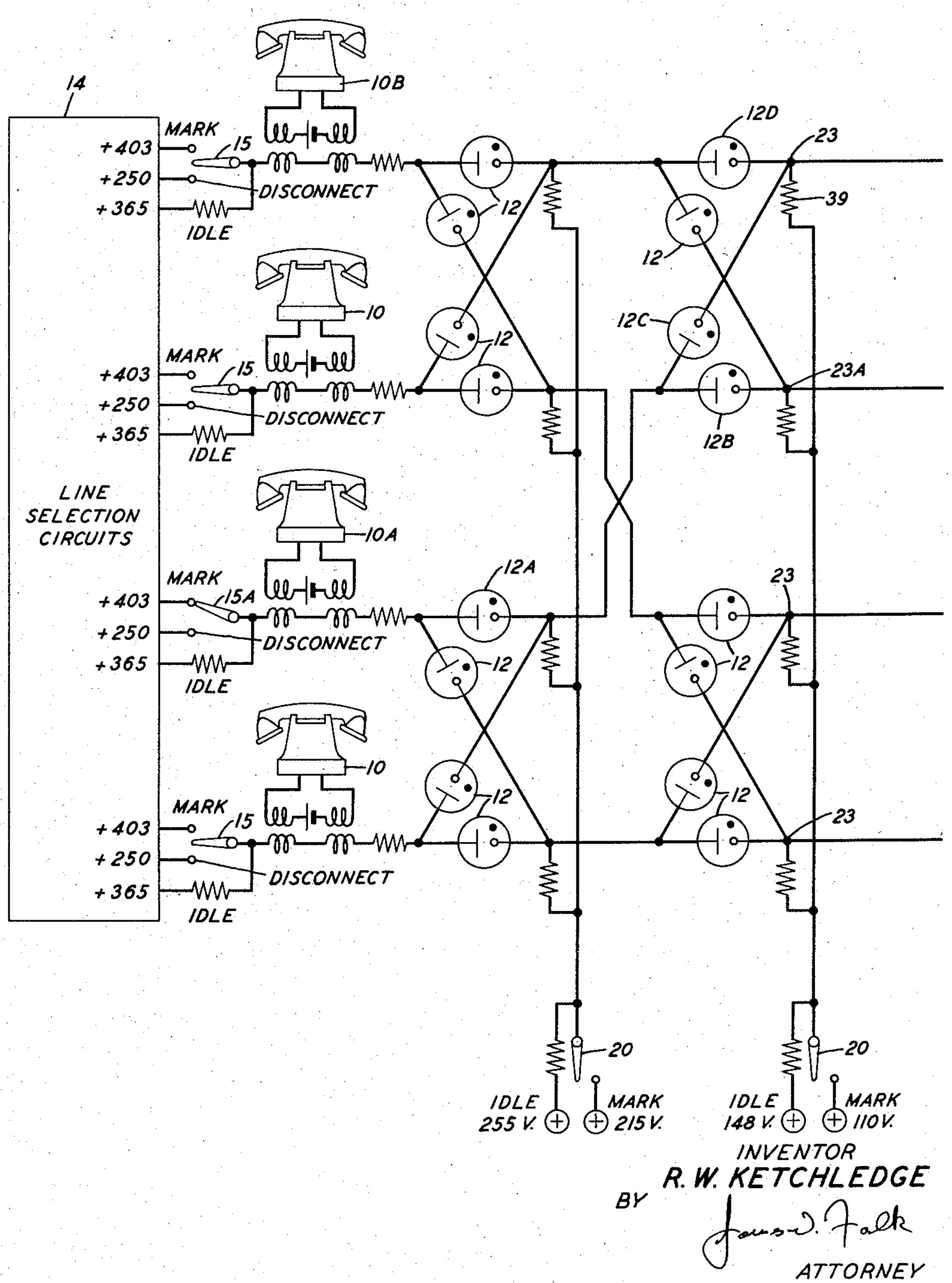
Figure 2:
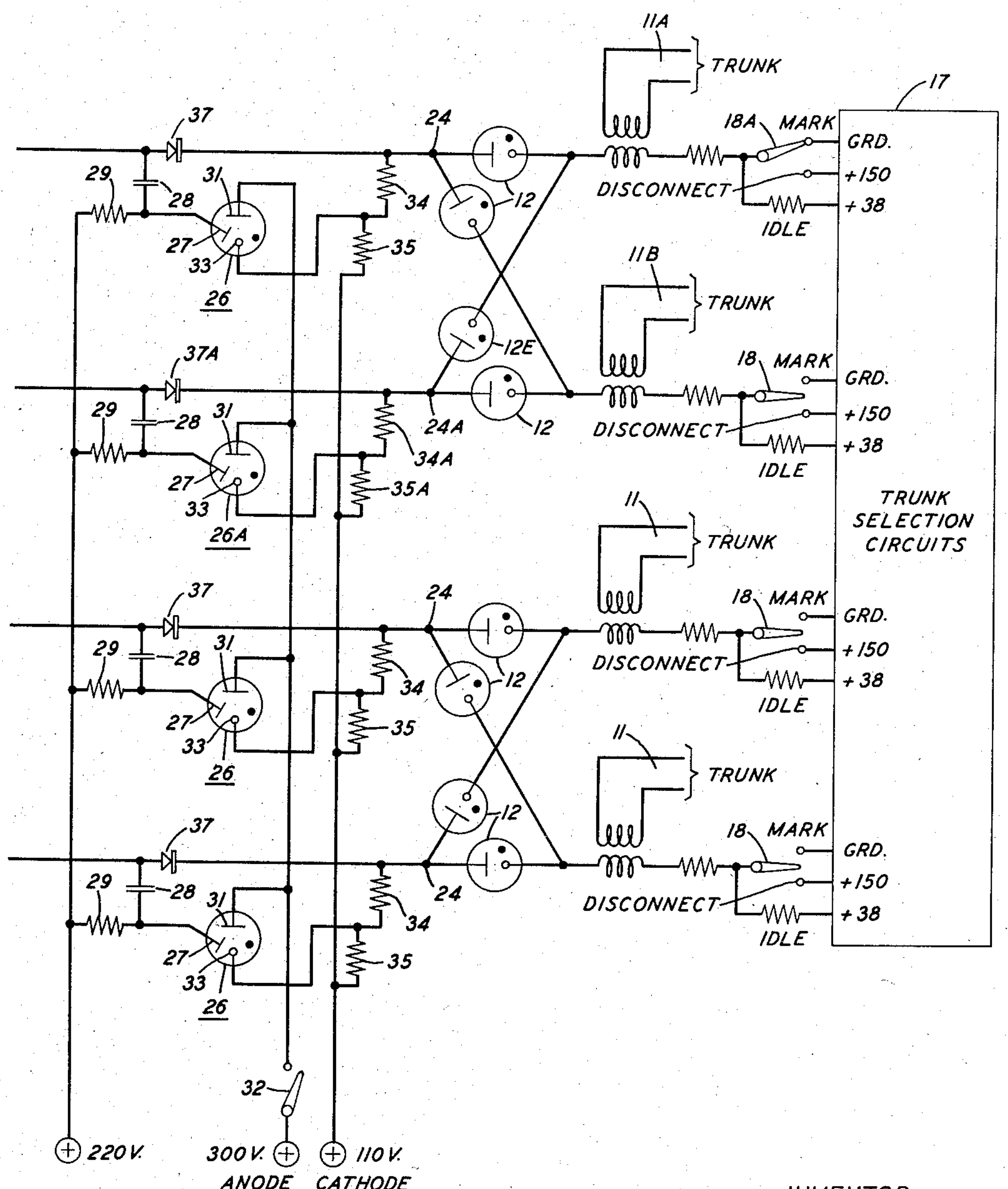

This invention relates to switching networks and more particularly to such networks for use in telephone switching systems wherein a path is established through the network on conduction through a selected number of switching devices operable sequentially on application of suitable marking potentials to the network and across the switching devices of the network, which devices are referred to as the crosspoints of the switching network.

In application Serial No. 201,578, filed December 19, 1950, of E. Bruce and H. M. Straube, now Patent No. 2,684,405, issued July 20, 1954, there is disclosed a selective switching network for a telephone system in which a plurality of gas tubes are connected together to define individual paths between any one of a number of inputs, which may be telephone subscribers, and any one of a number of outputs, which may be trunks. One of these possible paths is broken down on the application of marking potentials to a particular line and to a particular trunk while suitable marking potentials are applied also to the nodes within the network. A node is defined at each connection of the crosspoint tubes in the network.

In networks of this type, the operation is sequential, the crosspoints from one end of the network breaking down in succession. In the operation, each crosspoint connected between a vacant output node and a marked input node should be broken down, so that there is fanning out of crosspoints through which conduction exists until the other end of the network is reached. As only one trunk at that end is marked, only one path will be defined and conduction in the crosspoints not employed in that path will cease.

In prior types of circuits employing gas tubes as the crosspoint elements, the number of stages, and hence the size of the network, has been limited. In these networks the marking potential applied to a vacant node to break down the crosspoints connected to that node is transmitted through the priorly conducting tubes in the path and is therefore subject to great variation in value due to variations in the sustaining voltages of the prior tubes. Similarly, the breakdown characteristics of a gas tube are difficult to keep, in manufacture, within very precise limits. The necessity for keeping sufficient margins to prevent erroneous establishment of connections and to assure proper establishment of connections has limited the number of stages that can be thus operated in tandem. However, the margin requirements for sustaining multiple connections without interaction and the requirements for disconnecting these connections are far more lenient than those for the establishment of the connection.

It is an object of this invention to provide an improved switching network employing crosspoint devices in stages operated sequentially on application of appropriate working voltages to crosspoints of the network.

It is another object of this invention to provide an improved switching network employing gas tubes as the crosspoint devices of the network.

More specifically it is an object of this invention to increase the number of stages of such devices that may be operated in tandem in such a network.

It is a further object of this invention to provide an improved circuit for the establishment of a connection through a crosspoint within the interior of such network by the application of accurate and sufficient voltages to the crosspoint to break down the crosspoint on the reception of both feeble and variable marking signals transmitted through the prior devices in the conducting path.

These and other objects of this invention are attained in specific embodiments by the employment of a propagator circuit positioned at an interior node of the network. The node is divided into an input part, or side and an output part or side and the propagator circuit in accordance with this invention is positioned between these two parts of the node. Advantageously the marking process and the breakdown of the desired path is accomplished at relatively low currents and therefore with sustaining voltages appreciably higher than those associated with the holding currents applied through the tubes during conduction of the speech currents. These high sustaining voltages result in the marking potential applied to the outside of the node being feeble, and the variations in the sustaining voltages of the tubes result in the marking potentials being quite variable in amplitude.

In one specific embodiment in accordance with this invention, mark regeneration is accomplished by propagator circuits including a gas tube associated with the interior nodes. The gas tube, which is advantageously a triode, detects the feeble mark transmitted to it through the prior crosspoint tubes and transmits an accurate full mark to the next crosspoint tubes. A diode is connected across this triode and between the input and output sides of the node so that they assume appreciable different direct current potentials during the marking process. When the path goes into its holding state, however, this direct current isolation is removed. This is attained by assuring that the marking signal applied to the input side of the node is always smaller than the accurate mark which is to be transmitted onward; assuring that the signal applied to the input side of the node is small or feeble is compatible with the high sustaining voltages desired for the breakdown operation of the network, which prevent using large number of stages in the absence of propagator circuits in accordance with this invention. The input side of the node is then always displaced in direct current potential in the opposite direction to the holding condition until the marking process is completed.

Accordingly, in this specific illustrative embodiment of the invention, the mark signal which arrives at the interior node is smaller than the signal required to break down the next crosspoints. However, the alternating current change in the direct current potential at the input side of the node is recognized and applied to a starter electrode of the gas triode to cause the triode to conduct and apply an accurate mark to the output side of the node. This accurate mark voltage back-biases the diode. When the next crosspoint fires, it assumes a positive voltage sufficient to open the diode and to shunt out the triode, which may then be extinguished.

It is a feature of this invention that an interior node of a switching network be divided into an input and an output side and a propagator circuit be positioned between the two and coupled to the input side to recognize the alternating current change in direct current potential of the input side on application thereto of a marking signal from a prior crosspoint of insufficient amplitude to break down the next succeeding crosspoints.

It is a further feature of this invention that a diode or other unidirectional or asymmetrically conducting device be connected between the input and output sides of the node to be back-biased on application of the feeble marking signal to the input side and thereby provide direct current isolation between the two sides of the node, but to be forward-biased on breakdown of the next succeeding crosspoints.

It is a still further feature of this invention that the propagator circuit comprises a gas triode whose starter electrode is alternating current coupled to the input side of the node and one of whose electrodes defining the main gap of the triode is coupled to the output side of the node.

A complete understanding of this invention and of these and various other features thereof may be gained from consideration of the following detailed description and the accompanying drawing, the two figures of which, when placed side by side, are a schematic representation, partially in block diagram form, of a switching network illustrative of one specific embodiment of this invention. The network is shown as having only three stages and one propagator circuit for simplicity of description, but it is to be understood that switching networks in accordance with this invention may advantageously have considerably larger numbers of stages.

Turning now to the drawing, in the switching network there depicted any of a number of subscriber telephones 10 can be connected to any of a number of trunks 11 by a path defined by the gas tube crosspoints 12. The tubes 12 may advantageously be diodes of the type described in application Serial No. 169,121, filed June 20, 1950, of M. A. Townsend, which is now Patent 2,804,565, issued August 27, 1957, which exhibit a negative resistance in the range of operation for the transmission of the speech currents. Each line terminal of the switching network is connected to an idle condition voltage, which in this embodiment is assumed to be 365 volts, in the line selection circuits 14, and may be connected through a switch 15 to a marking potential, which in this embodiment is 403 volts. Similarly each trunk terminal of the switching network is connected to an idle voltage, which in this embodiment is 38 volts, in the trunk selection circuits 17, and may be connected to a marking potential, which is herein assumed to be ground, by a switch 18. Each interior node, of which in this embodiment there are but two sets between the three stages of the network, is connected to an idle voltage and may be connected to a suitable mark potential by a switch 20. The switches 15, 18 and 20 may be operated by an operator in the telephone office on receipt of proper signals from the lines and trunks indicating that a call is to be set up; the setting up of the call by operation of these switches and the line and trunk selection circuits 14 and 17 may advantageously be as set forth in application Serial No. 201,578, filed December 19, 1950, of E. Bruce and H. M. Straube, now Patent No. 2,684,405, issued July 20, 1954.

In this embodiment, the nodes of the second set are separated into an input side, designated by the junction 23 to which the prior crosspoint tubes 12 and a switch 20 are connected, and an output side, designated by the junction 24, to which the succeeding crosspoint tubes 12 are connected. Connected between the input and output sides 23 and 24 of the interior node are propagator circuits which, in accordance with this embodiment of the invention, each comprise a gas tube 26 having a starter electrode 27 connected by a capacitor 28 to the input side 23 of the interior node. A positive bias is applied to the starter electrode 27 through a resistor 29; this bias is itself insufficient to effect breakdown of the starter gap of the tube 26. The main anode 31 of each tube 26 is connected to a source of positive potential through a switch 32. The cathode 33 of each tube 26 is connected to the output side 24 of the interior node through a resistance 34 and the cathodes 33 are each connected through another resistor 35 to a source of cathode potential.

A diode 37 is connected directly between the input side 23 and the output side 24 of the interior node, and is connected so as to conduct only when the input side is at a higher potential than the output side. This diode may be of any of a large number of unidirectional or asymmetrically conducting devices, and may advantageously be of semiconductor material. A silicon junction diode may advantageously be employed as it has quite a high reverse impedance in combination with a low forward impedance. The reverse impedance of the diode 37 should be high enough so that possible variations in the value of this reverse impedance do not affect the voltages being fed through the resistances 34 to the output side 24 of the node. At the same time, in the forward state the diode 37 is in the talking path, as described further below, and, while the negative resistance characteristic of the talking path diodes 12 overcome its effect, it is still desirable to minimize the loss from this source.

Let us assume for purposes of describing the operation of this specific illustrative embodiment of this invention that subscriber 10A wishes to be connected through the switching network to trunk 11A and that, at this time, subscriber 10B is already talking on a path through the network through a connection on trunk 11B. On recognition of the request for this service, the operator will close switch 15A, switch 18A and both switches 20, as described in the above-mentioned Bruce-Straube patent. Switch 32 is similarly closed. Application of the mark potentials across tube 12A causes it to break down first, applying a mark signal to the anodes of tubes 12B and 12C; a mark potential of 110 volts is applied to the cathode of tube 12B by switch 20, but not to the cathode of tube 12C, as we have assumed tube 12D to be utilized in another talking path. Thus the junction 23 between tubes 12C and 12D does not assume the mark potential but stays at the prior idle potential for that node, due to current flow in the resistance 39 connected between the junction point 23 and the mark potential for that node. Accordingly, the path being set up does not employ crosspoint tubes which are connected to a talking path priorly set up.

On breakdown of the crosspoint tube 12B, a mark potential is applied through the tube 12B to the input side 23A of the second interior node. This mark potential is small and insufficient to break down the next stage crosspoint tubes. However, in accordance with an aspect of this invention the positive shift in potential at the juncton 23A is recognized, on an alternating current basis, by the starter electrode 27, being applied through the coupling condenser 28 to the starter electrode. This positive shift, when added to the direct current bias applied to the starter anode 27 through resistance 29 is sufficient to break down the starter gap and cause current to flow in tube 26A between its cathode 33 and main anode 31, following transfer of the discharge from the starter gap to the main gap as is known in the operation of gas triodes. When the tube 26A fires, current flows from the anode potential source through the tube 26A, and resistor 35A to the cathode potential source. The potential of the output side 24A of the interior node thus rises from the potential of the cathode source to the potential of the cathode source plus the IR drop across the resistance 35A. As both the current through the triode 26A and the value of the resistance 35A can be accurately predetermined, the mark voltage now applied to the third stage crosspoints, can also be accurately predetermined and can be of sufficient magnitude.

The application of the strong accurate mark potential from cathode 33 to the point 24A causes the right-hand side of the diode 37A to become positive with respect to the left-hand side of the diode, thereby back-biasing the diode and assuring direct current isolation between the input and output sides of the interior node during the marking of the next stage of the switching network.

As a mark potential has been applied by switch 18A to the cathode of tube 12E, to the anode of which this accurate mark signal has been applied by the propagator circuit, the tube will break down completing the path through the switching network. When the tube 12E breaks down the potential of the point 24 again changes, being now dependent on the current flowing through the tube 12E, resistance 34A, and resistance 35A to the cathode potential source. The value of resistance 34A and of this current is so chosen that the diode 37A is now biased in the forward direction, so that current is passed through the diode in the forward direction and the propagator circuit, including tube 26A, is shunted. The one path thus defined will go into a holding direction. Lockout occurs among the possible paths, assuming no other paths priorly set up in the switching network, in the usual way.

When the propagator circuit is shunted by the diode 37A being biased to pass current in the forward direction, the switch 32 is opened by the operator, and the triode 26A deionized, thereby releasing the propagator circuit. Another path can now be established through the switch utilizing another triode 26 however, as triode 26A is connected to an occupied node and, as priorly explained, a new path cannot be established through a node occupied on a priorly established path.

When the call between the subscriber 10A and the trunk 11A is completed, a disconnect signal is recognized by the operator and the switching path broken by applying a disconnect signal to either end or both ends of the priorly established paths by connecting switches 15A and 18A, to disconnect voltage sources sufficient to extinguish conduction in the tubes 12. These disconnect voltages may advantageously be of the order of 100 volts different than the idle potential; their exact value is not critical, being sufficient to extinguish the forward conduction but such that conduction through the switching network in the reverse direction cannot take place.

It is to be noted that during the marking process of the crosspoints of the succeeding stage in the switching network, the output side of the node to which the triode 26 is connected is always displaced in direct current potential in the opposite direction to the holding condition until the marking process is completed. Thus the small marking potential applied to the input side of the node from the prior switching stage crosspoint tube is insufficient to cause the diode to conduct in the forward direction, but is sufficient to allow the triode 26 to conduct to apply the marking signal to the next stage crosspoints.

While in the specific embodiment of a switching network depicted a propagator circuit has only been shown between two stages of the switching network, it is to be understood that, if desired, they may be included between each pair of stages within the switching network or spaced apart by a given number of such stages. Further, while a specific embodiment has been described it is to be understood that equivalent components known in the art could be employed for various of the components disclosed. Additionally, in the above-described embodiment the tubes 12 are broken down on the sequential application of the positive marking potentials transmitted from the line selection circuits to the trunk selection circuits. However this invention may be equally employed with switching networks in which negative marking potentials are transmitted through the network and propagated at an interior node. In such a circuit the starter electrode is a starter cathode cooperating with main anode, which is the output electrode connected through a resistor to the output part of the node. A suitable operating bias is applied to the main cathode of the tube and conduction may be extinguished by the temporary removal of this operating bias from the main cathode. The diode 37, across the propagating tube and between the input and output sides of the node, will have the opposite polarity to that shown in the drawing for the propagation of positive marking signals.

In each instance, however, whether positive or negative marking signals are to be propagated, the propagating circuit is interposed between two stages of the crosspoint devices and a diode is connected across the propagating circuit, the diode being back-biased during the application of the feeble mark signal to the propagating circuit and the marking of the next stage of crosspoints by the circuit in response thereto but allowing passage of current therethrough in the forward direction upon establishment of a conducting path through a crosspoint device in the succeeding stage of the network.

Further in each case the interposed propagating circuit comprises a gas tube having a starter electrode connected to receive a signal from the prior stage in the network and having a current path defined including the main gap of the tube for applying the accurately determined mark potential to the next succeeding stage in the network.

Thus it is to be understood that the above-described arrangements are merely illustrative of the application of the principles of the invention. Numerous other arrangements may be devised by those skilled in the art without departing from the spirit and the scope of the invention.

What is claimed is:

1. A communication switching circuit comprising a plurality of input lines, a plurality of output lines, crosspoint devices arranged in stages, interconnecting each of said input and output lines, means for establishing a path between a selected one of said input lines and a selected one of said output lines including means for applying mark voltages to said selected input and output lines, means interposed between two stages of said crosspoint devices for applying an accurate mark voltage to the succeeding stage crosspoint devices on receipt of a smaller mark voltage from a preceding stage crosspoint device, and diode means connected between said two stages and across said interposed means, said diode means being back-biased during the application of a mark voltage to the succeeding stage crosspoint devices by said interposed means but allowing passage of current therethrough in the forward direction upon establishment of a conducting path through a crosspoint device in the succeeding stage.

2. A communication switching circuit in accordance with claim 1 wherein said interposed means includes a source of direct current potential and means for superimposing on said direct current potential a transient voltage on the appearance of said smaller mark voltage at said interposed means.

3. A communication switching circuit in accordance with claim 2 further comprising means for releasing said interposed means after establishment of said path through the circuit.

4. A communication switching circuit comprising a plurality of input lines, a plurality of output lines, crosspoint devices arranged in stages interconnecting each of said input and output lines, means for establishing a path between a selected one of said input lines and a selected one of said output lines, including means for applying mark voltages to said selected input and output lines, means interposed between two stages of said crosspoint devices for applying an accurate mark potential to crosspoint devices of the succeeding stage on receipt of a smaller mark from a preceding stage crosspoint device, said last mentioned means including a gaseous discharge device having an anode, a starter electrode, and a cathode, means connecting said starter electrode to said preceding stage crosspoint devices and means connecting said succeeding stage crosspoint devices to a current path including the main gap of said discharge device, and diode means connected between said two stages and across said gaseous discharge device, said diode means being back-biased during application of a mark voltage to the succeeding stage crosspoint devices by said discharge device, but allowing passage of current therethrough in the forward direction upon establishment of a conducting path through a crosspoint device in the succeeding stage.

5. A communication circuit in accordance with claim 4 wherein said succeeding stage crosspoint devices are connected to said cathode.

6. A communication switching circuit in accordance with claim 5 wherein said means connecting said succeeding stage crosspoint devices to said cathode includes an impedance and comprising means applying a predetermined potential to said cathode and to said impedance.

7. A communication switching circuit in accordance with claim 4 wherein said means connecting said starter electrode to said preceding stage crosspoint devices includes a capacitor whereby a voltage is applied to said starter electrode through said capacitor only on a shift in potential at said prior stage crosspoint devices.

8. A communication switching circuit comprising a plurality of input lines, a plurality of output lines, a plurality of gaseous discharge devices arranged in stages interconnecting each of said input and output lines, means for establishing a path between a selected one of said input lines and a selected one of said output lines including means for applying mark potentials to said selected input and output lines, means interposed between two stages of said discharge devices for applying an accurate mark voltage to the succeeding stage discharge devices on receipt of a smaller mark voltage from a preceding stage discharge device, said last mentioned means including another gaseous discharge device having a starter electrode and a pair of main gap electrodes, alternating current coupling means connecting said starter anode to said preceding stage discharge devices, and means connecting one of said main gap electrodes to said succeeding stage discharge devices, and diode means connected between said two stages and shunting said another discharge device whereby said another discharge device is removed from the path defined by said priorly mentioned devices upon breakdown of a discharge device in the succeeding stage of the circuit.

9. A communication switching circuit comprising a plurality of input lines, a plurality of output lines, a plurality of gaseous discharge devices arranged in stages interconnecting each of said input and output lines, means for establishing a path between a selected one of said input lines and a selected one of said output lines including means for applying mark potentials to said selected input and output lines, means interposed between two stages of said discharge devices for applying an accurate mark voltage to the next succeeding stage discharge devices on receipt of a smaller mark voltage from a preceding stage discharge device, alternating coupling means connecting said interposed means and said preceding stage, and diode means connected between said two stages and across said interposed means, said diode means being back-biased during the application of a mark voltage to the succeeding stage discharge devices by said interposed means but allowing passage of current therethrough in the forward direction upon establishment of a conducting path through a discharge device in the succeeding stage.

References Cited in the file of this patent

UNITED STATES PATENTS

| | | |
|---|---|---|
| 2,023,589 | Hersey | Dec. 10, 1935 |
| 2,291,752 | Parker | Aug. 4, 1942 |
| 2,310,452 | Meacham et al. | Feb. 9, 1943 |
| 2,564,125 | Mohr | Aug. 14, 1951 |
| 2,629,021 | Robertson | Feb. 17, 1953 |
| 2,684,405 | Bruce et al. | July 20, 1954 |
| 2,688,661 | Van Mierlo | Sept. 7, 1954 |
| 2,722,567 | Davison et al. | Nov. 1, 1955 |
| 2,779,822 | Ketchledge | Jan. 29, 1957 |
| 2,780,674 | Six et al. | Feb. 5, 1957 |